United States Patent [19]

Rittenbach

[11] 3,860,760

[45] Jan. 14, 1975

[54] ELECTRONIC TIME COMPRESSOR OR EXPANDER

[75] Inventor: Otto E. Rittenbach, Neptune, N.J.

[73] Assignee: The United States of America as represented by the Secretary of the Army, Washington, D.C.

[22] Filed: June 6, 1973

[21] Appl. No.: 367,618

[52] U.S. Cl. .......................................... 179/15.55 T
[51] Int. Cl. ........................................... H04b 1/66
[58] Field of Search ..... 179/15.55 T, 15.55 R, 1 SA

[56] References Cited

UNITED STATES PATENTS

| | | | |
|---|---|---|---|
| 3,104,284 | 9/1963 | French | 179/15.55 T |
| 3,337,800 | 8/1967 | Halley | 179/15.55 T |
| 3,467,783 | 9/1969 | Magnuski | 179/15.55 T |
| 3,621,150 | 11/1971 | Pappas | 179/15.55 T |

OTHER PUBLICATIONS

J. S. Gill, A Versatile Method for Short-Term Spectrum Analysis in Real Time, Nature 1/14/61 p. 117–119.

Sangster, Bucket-Brigade Electronics–New Possibilities for Delay, Time-Axis Conversion and Scanning, IEEE Journal of Solid-State Circuits 6/1969 p. 131–136.

*Primary Examiner*—Ralph D. Blakeslee
*Attorney, Agent, or Firm*—Jeremiah G. Murray; Eugene E. Stevens, III; Frank J. Dynda

[57] ABSTRACT

The electronic time compressor or expander includes a memory for storing a plurality of samples from a predetermined portion of an input signal occuring over a first time period. The samples contained in the memory are presented at an output over a second time period which is either greater or less than the first time period. In this way, the frequency of the input information will have been translated either up or down. Several modifications showing various arrangements of memory elements and controls are shown. One modification shows a simple memory in the form of a shift register through which the samples of the input information are shifted. As the samples are shifted through the shift register, a clock and several down counters control gating devices which insert new samples of the input signal into the register at one rate and reads the stored samples from the register at a second rate. Another modification shows a static, rather than dynamic, memory in the form of a bank of analog storage elements such as capacitors into which input samples are stored at one rate through low impedance gates and out of which these samples are read at a second rate through high impedance devices. Other modifications include dynamic memories in the form of shift registers combined with gating systems for writing and/or reading samples into or out of the registers at selective locations and at different rates.

22 Claims, 22 Drawing Figures

ELECTRONIC TIME COMPRESSOR OR EXPANDER

BACKGROUND OF THE INVENTION

The present invention relates to an electronic time compressor or expander and more particularly to a device for automatically translating electrical signals from a first frequency band into a second frequency band by using the principles of either time compression or expansion.

In the field of electronic signal processing, the need often arises for translating an electronic signal from one frequency band to another. For example, a common type of frequency translator may be found in the FM heterodyne radio receiver wherein the continuous wave input signal is translated from the RF band to the IF band. The heterodyne process consists of combining in a nonlinear device the RF input signal with a locally generated signal having a slightly different frequency. Frequencies equal to the sum and difference of the mixed frequencies are produced by the nonlinear device. In other words, the signals in the first frequency band are translated to the second frequency band by adding or subtracting a constant factor, i.e., the local frequency. In this type of frequency translation, the width of the second or translated frequency band will be equal to the width of the first frequency band. Also, corresponding differences or changes in frequency in the two bands will also be equal.

A second method of frequency translation may be practiced by multiplying the frequencies in the first frequency band by a common factor to produce the second or translated frequency band. Using this method of frequency translation, the width of the second or translated frequency band will not be equal to the width of the first frequency band; but will be either increased or decreased by the common factor. Also, all changes in frequency appearing in the first frequency band will be multiplied by the common factor during translation to produce corresponding greater or smaller frequency changes in the translated band.

One implementation of a frequency translator which performs translation by multiplying the frequencies by a common factor may be classified as an electronic time compressor or expander. The process of electronic time compression or expansion consists of reproducing over a given time period electronic information which occurred originally over a longer or shorter time period. For example, the playing back of a phonograph record or a magnetic tape recording at a speed other than the originally recorded speed is a simple example of frequency translation by electronic time compression or expansion. This principle is similar to photographic time compression which is commonly used to make visible to the human eye the action of a flower blooming or the formation of clouds by rapidly projecting on a motion picture screen a series of pictures which were originally taken over a period of a day or two. Slow motion photography is an example of photographic time expansion.

Frequency translation by electronic time compression or expansion has many useful applications in the processing and analyzing of electronic signals in the fields of radar, sonar, seismology, biomedicine, surgery, machine design, to name a few. For example, those concerned with the development of moving target indicator (MTI) radars have long recognized the need for a suitable detector of low-speed targets having doppler shifts too low for satsifactory presentation to the ear. Automatic detection of these low-speed targets has been employed in the past, but even the most elaborate schemes used today are no match for the excellent recognition capability of the human ear-brain combination. Therefore, there is a need for a suitable frequency translator capable of translating these small doppler shifts higher up into the audible frequency band. Similarly, radar reflections from highspeed satellites may produce doppler shifts beyond the audible band making analysis by the ear impossible. Translation of these signals into the audio band by the methods of time expansion will make effective analysis by the ear possible. Further, ultrasonic and infrasonic signals occurring in the earth, the human body, mechanical devices, and elsewhere can also be analyzed more effectively by trained operators employing the methods of electronic time compression or expansion.

Translated signals generated by electronic time compression and expansion may have other unique characteristics not found in signals translated by other methods. For example, in an MTI radar, the gaps produced by electronic time compression may be used for repetitive presentation of the translated signal to get a "second look" at a questionable target.

SUMMARY OF THE INVENTION

The general purpose of this invention is to provide an electronic time compressor or expander which automatically translates the frequency of input signals. To attain this, the present invention contemplates a unique system, whereby an input signal is sampled and stored in a memory at a first rate and read out at a second rate. The information in the memory is automatically updated by sampling the input periodically and readjusting the information stored in the memory.

Other objects and features of the invention will become apparent to those skilled in the art as the disclosure is made in the following description.

DETAILED DESCRIPTION OF THE PREFERRED EMBODIMENTS

Figure 1:
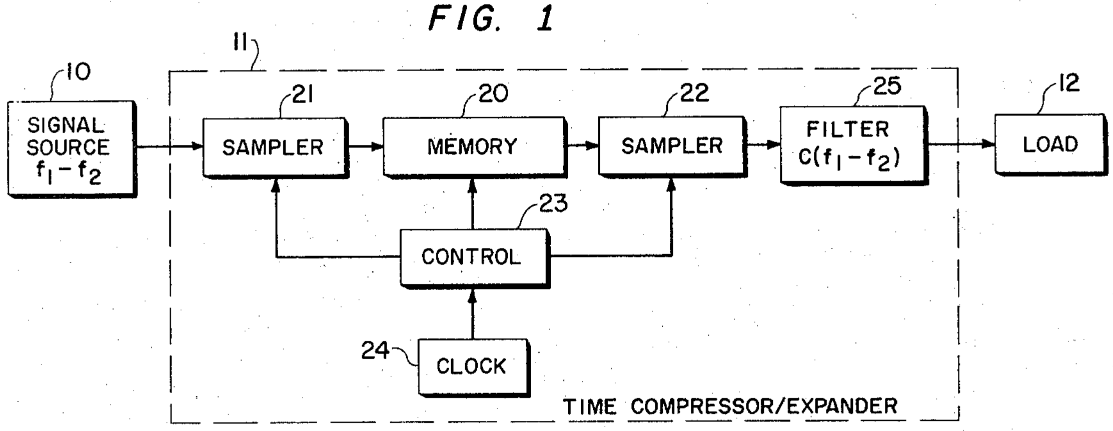
FIG. 1 shows a block diagram of the system employing the invention.

Referring now to the drawing, there is shown in FIG.

1 the general organization of a system utilizing the present invention. The signal source 10, having an output frequency band $f_1$-$f_2$ ($f_1$ and $f_2$ represent the upper and lower frequencies of the band), is connected to the input of the time compressor or expander 11 which in turn is connected to the output to the load 12. The time compressor or expander 11 translates the frequency band $f_1$-$f_2$ into the frequency band $Cf_1$-$Cf_2$ where C is a constant defined as the compression factor. For C greater than one, there is a positive compression and for C between zero and one there is a negative compression or expansion.

The compression factor C is determined by the internal design of the time compressor or expander 11 as will be seen later. Included in device 11 is a memory 20 for storing successive samples of the output of signal source 10 via a sampler 21. The output of memory 20 is connected to a second sampler 22. A control 23, synchronized by a clock 24, is connected to the samplers 21 and 22 and memory 20. Finally, the output of sampler 22 is passed through a band-pass filter 25 which passes the frequency band $Cf_1$-$Cf_2$ to the load 12.

In general, the time compressor or expander 11 samples the output of signal source 10 at some predetermined rate, as determined by the clock 24 and control 23, and stores the values of the successive samples in memory 20, which is also under the control of control 23. The contents of memory 20 are read by a sampler 22 at a second rate, as determined by control 23 and clock 24. Also under the control of clock 24 and control 23, sampler 21 will periodically update the memory 20 by dripping or erasing the oldest samples contained therein and substituting new samples therefor. The compression factor C will be equal to the ratio of the sampling rates of samplers 22 and 21. The filter 25 will remove all frequency components generated in the sampler 22 which are outside the frequency band of interest.

Let it be assumed that the signal source 10 is an MTI doppler radar capable of detecting low-speed targets such as walking or crawling personnel, bicycles, tanks and other tracked vehicles, etc. Typical doppler shifts associated with such targets might fall in the range of about 1–200Hz. Although the audio frequency band is considered to range from about 15 to 20,000Hz, the average human using a set of standard headphones cannot effectively analyze signals below 50Hz. Therefore, a substantial portion of the doppler signals from low-speed targets will fall below this effective range of analysis. The remaining doppler signals above 50Hz, being located near the low end of the audio range, would be more effectively analyzed if translated higher up in the audio frequency range.

It is generally known in the field of MTI radar that nearly every type of target has in general its own unique characteristic doppler signal. These characteristics are a result of frequency and amplitude modulations of the doppler return resulting from differences in the radial velocities of the various parts of the specific type of target. For example, the radial velocity of the knees of a crawling man will product a substantial modulation of the overall doppler signal associated with the remainder of his body in a way that will be different from these modulations caused by a walking man. However, many of these modulations are small and are either lost or too difficult to analyze and detect in the normal manner. However, when these small doppler signals are frequency translated higher up into the audible band by the time compression technique, these unique changes in frequency and modulations will become more pronounced thereby enhancing detection.

Returning to FIG. 1, if the output frequency band, $f_1$-$f_2$, of signal source 10, now assumed to be an MTI radar, is equal to 10–200Hz and the time compressor 11 has a compression factor C equal to 10, then the input to the load 12, which may be a pair of headphones or a loudspeaker, will be an audio signal in the band 100–2000Hz. Therefore, the original frequency band, having a width of 190Hz, will be translated into a much wider band, having a width of 1,900Hz. Likewise, those small changes in frequency or modulations will now be greater and therefore more pronounced and more readily recognized in the translated band.

In place of an MTI radar, the signal source 10 could have been a sonar device or a seismic detector or even a surgical diagnostic machine, e.g., and electrocardiograph or electronic stethascope. The load 12 might also be a recorder or an oscilloscope. The frequency bands and the reasons for translation may be different in each of the various applications, but the principle remains the same.

Returning to the example of the MTI radar, because the compression factor C was assumed equal to 10, the sampler 22 of time compressor 11 must have a sampling rate which is 10 times greater than the sampling rate of sampler 21. Also, in accordance with the well-known principles of sampling theory, to avoid a loss of information, the sampler 21 must be capable of sampling the output of signal source 10 twice during each cycle of the highest frequency in the output band $f_1$-$f_2$. Because the output band of signal source 10 was assumed to be 10–200Hz, the sampler 21 must therefore sample at a rate of at least 400 samples per second. Because the compression factor C is 10, the sampler 22 must therefore operate at the rate of at least 4,000 samples per second.

Figures 2A, 2B, 2C, 2D, 2E, 2F:
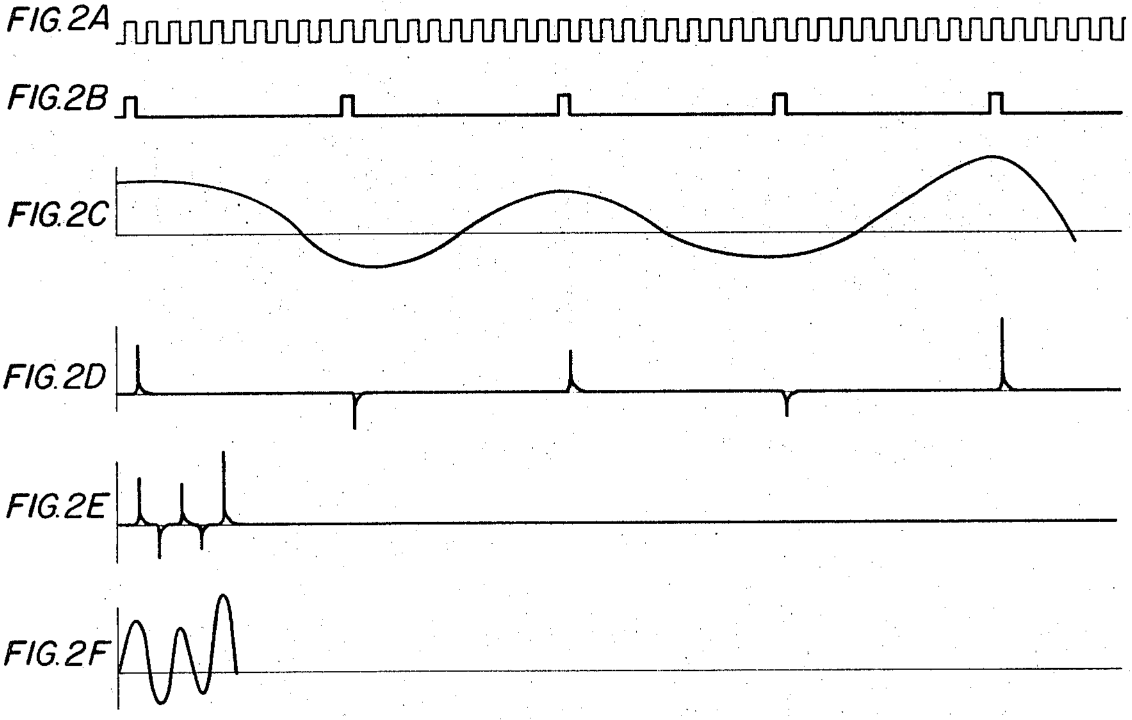
FIGS. 2A–2F show waveforms useful in describing the operation of the device of FIG. 1.

The signal of FIG. 2A represents the output of clock 24 which, for the present example, will be assumed to be running at a rate of 4,000PPS. The signal of FIG. 2B represents the input to sampler 21 from control 23 and is assumed to have a rate of 400PPS. The signal of FIG. 2C represents the output signal from signal source 10, which is assumed in this example to have frequency components in the band 10–200Hz. The signal of FIG. 2D represents the output of sampler 21 and shows a series of impulses occurring at the sampling rate of 400PPS and having amplitudes equal to the corresponding instantaneous amplitudes of the signal of FIG. 2C.

The memory 20, under the control of control 23, stores a finite number of these successively sampled amplitudes shown in FIG. 2D. For purpose of simplicity, let it be assumed that the memory is capable of storing 400 successive samples, i.e., one complete second of input information.

Now, since sampler 22 is assumed to be sampling at a rate of 4,000 samples per second, it will read or "play back" one second of the original input information in one-tenth of a second. FIG. 2E illustrates the output signal from sampler 22 and shows the same five samples shown in FIG. 2D compressed into a time period which is one-tenth that of the naturally occurring time period of those same five samples. There is no significance between the relative position of the signal in FIG.

2E and those signals in FIGS. 2A–2D. The signal of FIG. 2F represents the resulting output $Cf_1$-$Cf_2$ of filter 25. It is noted that the high frequency components of the signal in FIG. 2E have been removed in the filter 25 and that the signal of FIG. 2F has components in the band $Cf_1$-$Cf_2$, i.e. 100–2,000Hz. The signal in FIG. 2E is shown as a series of impulses for convenient illustration. In a practical device the output of sampler 22 might have more energy if it were a series of rectangular pulses.

It is again pointed out that the sampler 22 read in one-tenth of a second from memory 20 a set of 400 successive samples which were obtained originally during a period of one second by the sampler 21. It is also pointed out that during this one-tenth of a second, the sampler 21 sampled 40 new samples. In order to make room in memory 20 for these 40 new samples, 40 of the oldest samples are dropped from memory 20 by control 23. Also, sampler 22 can now read 40 of the most recent input samples. These 40 new samples will be read or "played back" by sampler 22 in the next one-hundredth of a second. During this time, four more new samples will be sampled by sampler 21 and stored in memory 20. These latest four new samples are now read by sampler 22 in the next one-thousandth of a second, during which time no additional new samples will have been sampled by sampler 21.

To summarize, sampler 22 will have read or "played back" a grand total of 444 successive samples in a time period of 0.111 seconds from a memory having storage for only 400 samples. These 444 successive samples will have occurred originally in a time period of 1.11 seconds. Or in other words, the 444 successively read samples will have been time compressed into a time period which is one-tenth the original time period.

Now, the earliest time that sampler 22 can start reading the next completely new set of 444 successive samples is 0.999 seconds later. This almost one second interval or gap may be used to replay some of the old information over along with some of the newer samples as they become available.

As will be seen later, certain structural advantages are realized if, instead of reading the updated samples as soon as they become available, a predetermined number of the new samples are temporarily stored in a special section of memory 20 and not read until all of the predetermined number have been stored. For example, of the 400 stages in memory 20, the samples in 300 stages may be read by sampler 22 while the other 100 stages are updated with new samples. After these 100 newest samples are stored in memory 20, the control 23 could direct sampler 22 to read only the 300 newest samples while the next 100 samples are placed in those stages of memory 20 which contain the oldest 100 samples.

Figure 3:
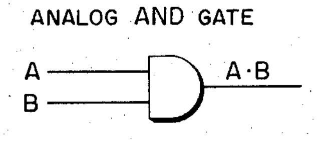
FIG. 3 shows a symbol used in the drawings.

More specific implementations of the time compressor 11, demonstrating these alternatives, will now be described. The analog AND gate symbol in FIG. 3 is used throughout the drawings and will be defined here as a gate having one analog input A and one binary input B which may assume the value of either one or zero. When binary input B is a one, then the analog AND gate is considered to open and the value of the analog input A will appear at the output of the gate. When the value of the binary input B is zero, the analog AND gate is considered to be closed and the value at the output of the gate is zero. This gate may be implemented with a multiplier circuit which multiplies the inputs A and B. The analog AND gate will be referred to in the description as a sampling gate, since the value of the analog voltage at the output will usually be an instantaneous sample of the analog input A when the binary input B is one. The use of a small circle to indicate inversion of the binary input B is also used, e.g., gate 35 in FIG. 4. In these gates the analog voltage is sampled by a binary zero rather than a binary one, i.e., a binary zero opens the gate and a binary one closes the gate.

Figure 4:
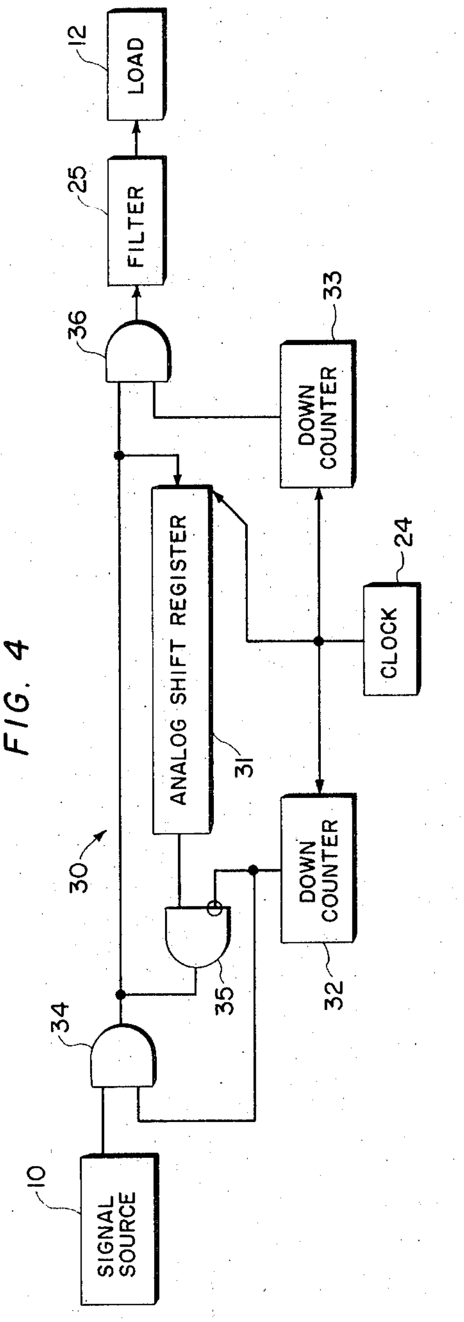
FIG. 4 shows a block diagram of one of the embodiments of the invention.
Figure 12:
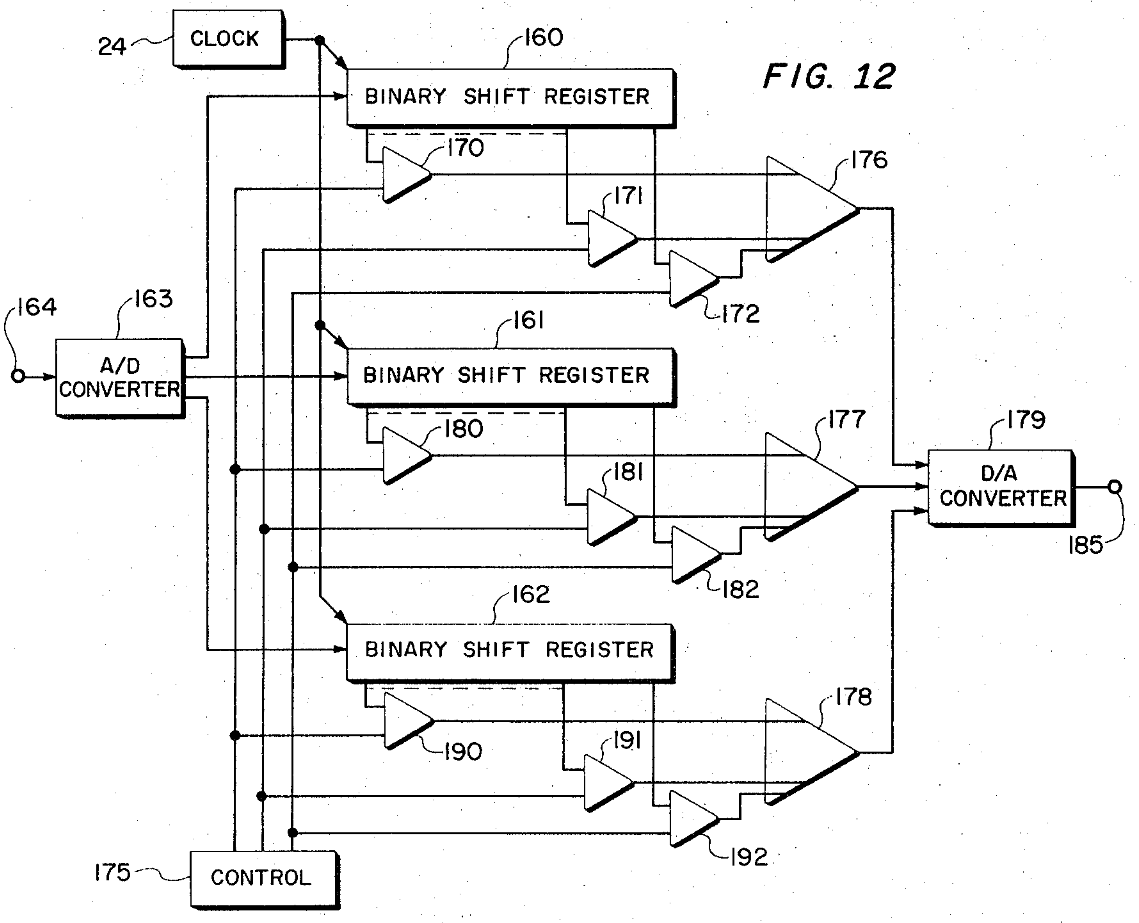
FIG. 12 shows a device which may be substituted for portions of the devices shown in FIGS. 4, 6, 9, 10 and 11.

Also used in the drawings is a box labeled analog shift register, e.g., register 31 in FIG. 4, which refers to a memory having a series of stages in which the values of the quantities stored in each stage thereof can assume a continuum of values rather than just two values as in the binary shift register. Examples of analog shift registers in the prior art are analog delay lines synchronized by a clock signal or the like. For example, a plurality of series connected analog sample-and-hold circuits properly synchronized by a trigger operates as an analog shift register. More recently, analog shift registers or analog delay lines have been built from charged coupled devices (CCD) as explained in the article Designers Guide To: Charged Coupled Devices, Barry T. French, EDN Jan. 20, 1973. It is also noted at this point that in the present invention the analog shift registers may be replaced by a system including a plurality of binary shift registers combined with some A/D converters and a control. An example of such a device will be described later, and is shown in FIG. 12.

FIG. 4 shows a time compressor 30 connected between the signal source 10 and the load 12. This particular modification affords a simple design and has the advantage that the control circuitry would be relatively simple and inexpensive. The time compressor includes a clock 24, a filter 25, a memory in the form of analog shift register 31, a control system made up of down counters 32 and 33, and samplers consisting of the analog AND gates or sampling gates 34, 35 and 36.

For purposes of explaining the operation, assume that the output of signal source 10 lies in the frequency band of 10-200Hz and that the compression factor C of time compressor 30 is to be 3.5. Assume further that the rate of clock 24 is 2,800PPS and that down counters 32 and 33 have counting rates of 7:1 and 2:1 respectively. Finally, assume further that analog shift register 31 has a total of five stages.

The device of FIG. 4 will now be described with reference to the waveforms of FIGS. 5A–5C and the values given above. Since the upper frequency in the output band of signal source 10 is assumed to be 200Hz, then the output of down counter 32 must be at least 400PPS. Also, since the compression factor C is assumed to be 3.5, then the output of down counter 33 must be 1,400PPS. The rate of clock 24 was assumed to be 2,800PPS and is represented by the waveform in FIG. 5A. The outputs of down counters 33 and 32 are represented by the waveforms shown in FIGS. 5B and 5C respectively. The waveforms in FIGS. 5B and 5C will have rates of 1,400PPS and 400PPS respectively.

As shown in FIG. 4, the shift register 31 is shifted at the 2,800PPS rate by the output of clock 24. The input to the shift register 31 is an analog voltage received either from the output of signal source 10, via sampling gate 34, or the output of shift register 31, via sampling gate 35. When sampling gate 34 is opened, sampling gate 35 is closed and vice versa.

In general, the operation of the time compressor 30 is such that the samples stored in register 31 are continuously shifted at the rate of 2,800PPS by clock 24 along the register 31, out gate 35, and back into the input of register 31. As the samples are traveling around this ring, sampling gate 36 is periodically opened by the output of the 2:1 down counter 33, such that every other sample is read and passed to the load 12 via filter 25. At the other end, the sampling gate 34 is periodically opened by the 7:1 down counter 32 to update the stored samples.

To more fully understand the operation, consider the numbers appearing above and below the pulses in FIGS. 5A–5C, which represents an arbitrary assignment of numbers to the samples contained in the register 31. The numbers above the pulses are used to explain the operation of the device as a compressor having a compression factor C greater than 1. For a compression factor C between 0 and 1, the numbers below the pulses in FIGS. 5B and 5C are used.

At some arbitrary starting point in time, the samples contained in register 31 are numbered from No. 1–No. 5 starting with the sample in the output stage and ending with the sample in the input stage of register 31. The numbers shown in FIGS. 5A–5C represent the numbers of the sample shifted into the input stage of register 31 at that point in time. Also at this arbitrary starting point in time, pulses appear at the outputs of both down counters 32 and 33 as represented by the first pulses in the waveforms of FIGS. 5B and 5C. The No. 1 sample will first be shifted out of the output stage of register 31 and a new sample indicated as No. 1′ will be stored in the input stage of register 31 via gate 34. Also, while the new No. 1′ sample is being stored in the input stage of register 31, it is also being read by gate 36. The No. 2 sample is now located in the output stage of register 31. With the arrival of the next clock pulse, the No. 2 sample is shifted into the input stage of register 31 via gate 35. Gates 34 and 36 remain closed during this clock cycle and the No. 2 sample is neither read nor updated. During the next clock cycle, the No. 3 sample is shifted from the output stage to the input stage of register 31, while the gate 36 samples the value of the No. 3 sample. Gate 34 remains closed during this clock cycle. This process continues and, as can be seen from FIG. 5B, while the samples are shifted around the ring at the clock rate, they are read by gate 36 at half the clock rate in the following order No. 1′, No. 3, No. 5, No. 2, No. 4, No. 1′, No. 3′, No. 5′, No. 2, No. 4, No. 1′, No. 3′, No. 5′, No. 2′, No. 4′, No. 1′, No. 3′, No. 5′, No. 2′, No. 4′, No. 1″ etc. As the samples are shifted around the ring, they are also updated at one-seventh the clock rate in this same order as can be seen from FIG. 5C. In the above series of sample numbers, each time a sample is updated, the sample number is primed. Initially, the No. 1 sample was both updated and read simultaneously and is therefore shown primed as No. 1′. Then, after seven clock pulses, the No. 3 sample is updated via gate 34. After seven more clock pulses, the No. 5 sample will be shifted from the output stage of register 31 into the closed gate 35 and a new updated No. 5′ sample shifted into the input stage of register 31. During this clock cycle, the gate 36 will be opened and the updated No. 5′ sample read. After each seven clock periods, the stored samples are each updated in the same order in which the samples are read. This process simply continues and produces a compressed signal at the load 12.

Figure 5A:
FIGS. 5A–5C are waveforms useful in explaining the operation of the device shown in FIG. 4.
Figure 5B:
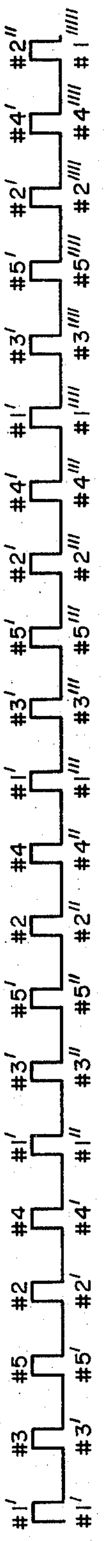
Figure 5C:
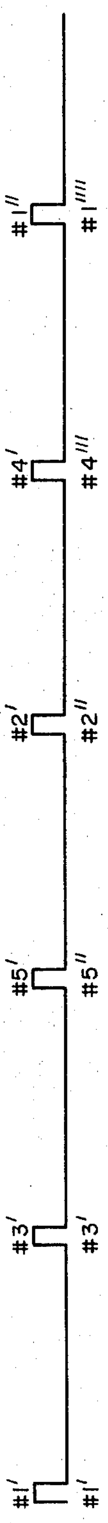

As can be seen from FIGS. 5A–5C, it takes 35 cycles of clock 24 to update five successive samples. These five successive samples are read once by gate 36 over a period of only 10 clock cycles. Therefore, the compression factor is 35:10 or 3.5. In other words, and as can be seen from comparison of FIGS. 5B and 5C, during the time it takes to update five successive input samples, the five samples stored in register 31 will have been read three and one-half times. The output of filter 25 is therefore a time compressed version of the output of signal source 10.

The rates used in the description of FIG. 4 were chosen to simplify the description. A more practical device would include a shift register 31 having for example 512 stages, a rate of 292,740PPS for clock 24 and counting rates of 717:1 and 205:1 for down counters 32 and 33 respectively. The compression factor would still be about 3.5. With these values a greater number of successive samples were read before the reading cycle is repeated for the same samples. Also, it is important that the memory or register 31 contain a sufficient number of samples to cover at least one complete cycle of the lowest frequency $f_1$ in the input band. Because shift registers, analog and digital, usually contain a number of stages equal to two raised to a power a number such as 512, i.e., $2^9$, was chosen.

A compression factor C between zero and one is also possible for the device of FIG. 4. For example, consider the counting rates of down counters 32 and 33 to be reversed from the previous example, i.e. 2:1 and 7:1 respectively. The waveforms of FIGS. 5B and 5C will also be exchanged and now represent the updating rates and reading rates respectively. It can be seen from the sample numbers below FIG. 5B that during the first four clock periods only two samples were updated, viz. No. 1′ and No. 3′. From the sample numbers below FIG. 5C, it can be seen that during the first 14 clock periods, only two samples were read, viz. the updated samples No. 1′ and No. 3′. Therefore, that portion of the output from signal source 10 associated with these first two samples No. 1′ and No. 3′ will have been read at a rate substantially slower than the rate at which they originally occurred.

Continuing further, the next five updated samples No. 5′, No. 2′, No. 4′, No. 1″ and No. 3″ will never be read at all and will simply be dropped. Starting with the 15th clock period and ending with the 29th clock period, another negative-compression or expansion reading cycle will be conducted, wherein the successive samples No. 5″ and No. 2″, which were originally updated during a time interval of four clock periods, are read during a period of 14 clock periods.

In this simple example, the output of signal source 10 is expanded or compressed negatively using only two successive samples. In a practical device many more samples would be used. The compression factor C in this example is 2/7.

The FIG. 4 modification has the advantages that it is of simple construction and the compression factor C can usually be varied by simply changing the relative counting rates of down counters 32 and 33. However, a disadvantage of the device of FIG. 4 is that for a given input frequency the speed of the shift register 31 will be very high for large compression factors C.

Figure 6:
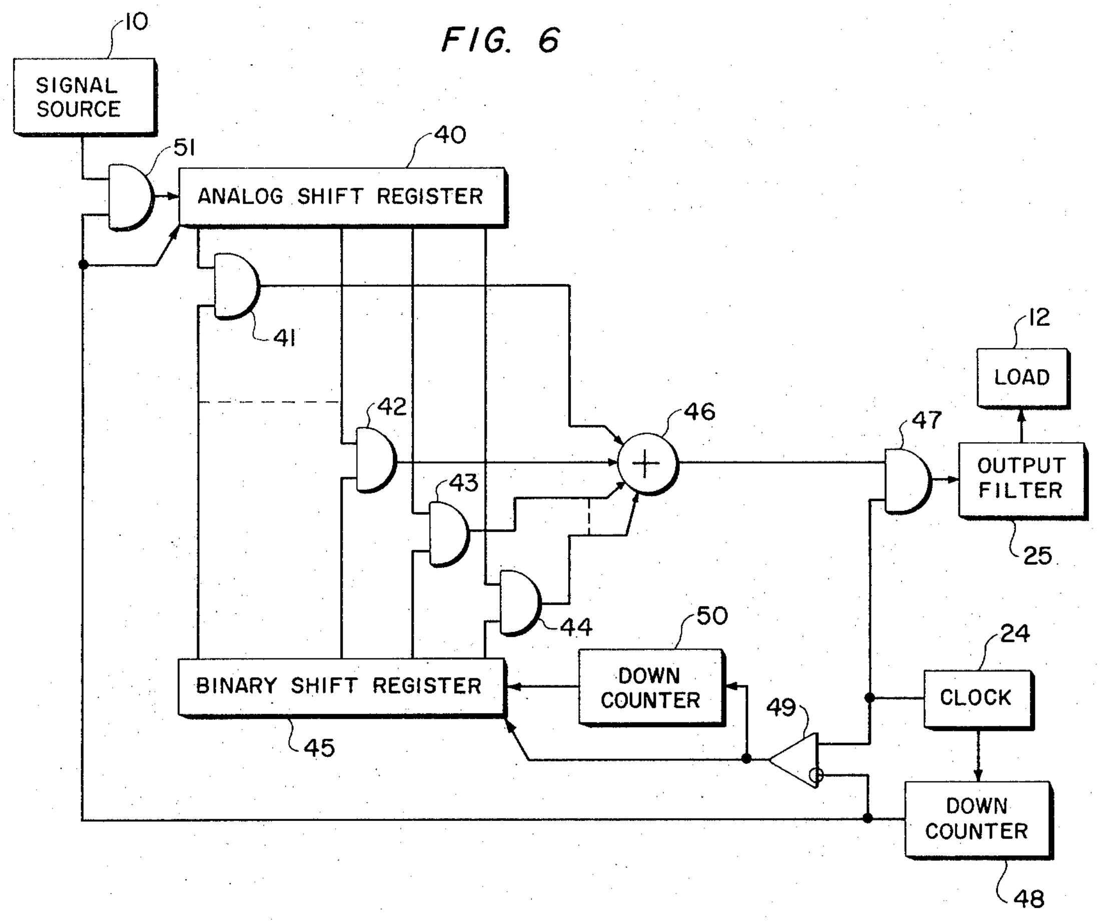
FIG. 6 shows a second embodiment of the invention.

In contrast thereto, FIG. 6 shows a modification wherein, the shifting speed of the analog shift register used therein is relatively slow for even large compression factors C. The device of FIG. 6, of course, is more complex than that of FIG. 4 in that a large number of sampling gates are used therein.

As seen in FIG. 6, the output of the signal source 10 is connected to the input stage of the analog shift register 40 via sampling gate 51. The outputs of each stage of the shift register 40, besides being connected to the next stage, are also connected to the analog inputs of one of the sampling gates 41–44. If the analog shift register 40 has 512 stages, then there will be 512 sampling gates 41–44. A binary shift register 45, having an equal number of stages as there are sampling gates 41–44, has the output of each of the stages thereof connected to the binary input of the sampling gates 41–44. The outputs of the sampling gates 41–44 are connected to a summing point 46 which in turn is connected to the analog input of the sampling gate 47. Clock 24 has the output thereof connected to the binary input of sampling gate 47, down counter 48, and an input to the binary AND gate 49. The other input to binary AND gate 49 includes an inverter connected to the output of down counter 48. Down counter 50 has the input thereof connected to the output of gate 49 and has the output connected to the input stage of a binary shift register 45. The analog shift register 40 is driven by the output of down counter 48 while the binary shift register 45 is driven by the output of gate 49.

In general, the operation of the device of FIG. 6 is such that successive analog samples of the output of signal source 10 are sampled and shifted into analog shift register 40 via sampling gate 51 at the rate of the output of down counter 48. The contents of the analog shift register 40 are read by the sampling gates 41–44 which are opened in succession by a binary one which is inserted in binary shift register 45 by the output of down counter 50 and shifted along register 45 at the rate of the output of gate 49.

More specifically, assume by way of example that the clock 24 runs at a rate of 1,428PPS and that down counters 50 and 48 have counting rates of 512:1 and 4:1 respectively. Assume further that analog shift register 40 and binary shift register 45 have 512 stages each and that there are 512 sampling gates 41–44.

Figures 7A, 7B, 7C, 7D:
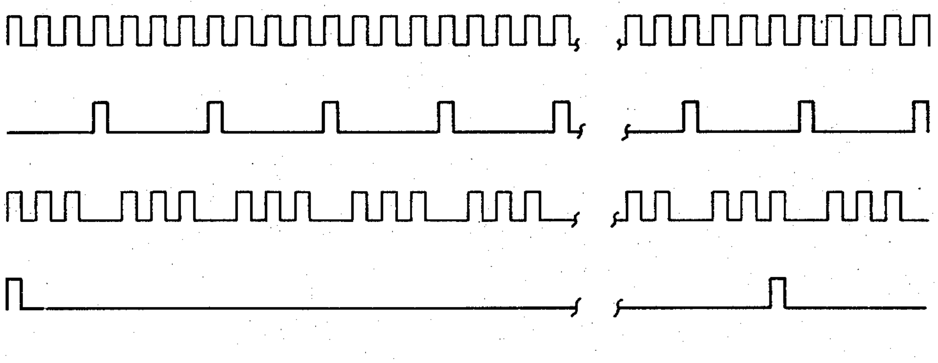
FIG. 7A–7D are waveforms useful in describing the operation of the device shown in FIG. 6.

Referring now to FIGS. 7A–7D, the operation will be described in detail. Waveform 7A represents the output signal from clock 24. Therefore, the output of down counter 48 is shown in FIG. 7B, the output of gate 49 is shown in FIG. 7C, and the output of down counter 50 is shown in FIG. 7D. Initially, assume that the analog shift register 40 has 512 of the most recent samples stored in successive stages and that the down counter 50 has just completed a count, as indicated by the first pulse in FIG. 7D. Therefore, a binary one is shifted, by the output of gate 49, into the input stage of binary shift register 45 as indicated by the first pulse in the waveform of FIG. 7C. At this point the gate 44 is opened causing the analog voltage sample stored in the output stage of analog shift register 40 to appear at the summing point 46 and at the input to filter 25 via sampling gate 47, which is momentarily opened by the first clock pulse, as indicated, in the waveform of FIG. 7A. It is noted that the sample just read is the oldest stored sample in register 40.

Next, with the arrival of the second clock pulse, FIG. 7A, a pulse appears at the output of gate 49, FIG. 7C, causing the pulse in binary shift register 45 to shift to the next stage, thereby opening gate 43 which in turn passes the analog voltage stored in the second stage of register 40 to the input to filter 25 via summing point 46 and sampling gate 47.

The same type of action takes place with the next clock pulse, third pulse in FIG. 7A, with the result that the analog sample stored in the third stage of register 40 is passed to the input to filter 25 via gate 42, summing point 46 and gate 47.

On arrival of the fourth clock pulse, 4:1 down counter 48 will generate an output pulse. This first output pulse is shown in the waveform of FIG. 7B and is used to drive the analog shift register 40 and shift the analog samples therein one stage to the right in FIG. 4, while inserting in the input stage of register 40 a new analog sample from the output of signal source 10 via gate 51. It is now noted that the fourth sample to be read was also shifted from the fourth stage to the third stage of register 40. It is for this reason that the binary one in the register 45 is not shifted at this time but remains in the third stage of register 45. The register 45 is not shifted in this clock cycle because the gate 49 remained closed as indicated by the missing pulse in the waveform of FIG. 7C. Therefore, when the fourth pulse from clock 24 opens sampling gate 47, the third stage of register 40 will be read again simply because this stage now contains the fourth sample.

This process continues, as shown in the waveforms, until there have been 512 pulses appearing in the waveform of FIG. 7C. On the 513th pulse in the waveform of FIG. 7C, the old binary one in register 45 will be shifted out and a new binary one will be inserted in the input stage thereof by the output of 512:1 down counter 50. The cycle is now repeated.

The compression factor C for this example will be the ratio of the rate of the clock 24, which operates the output sampling gate 47, and the rate of the output of down counter 48, which establishes the rate at which input samples are sampled by gate 51 from the output of signal source 10.

Since the clock rate of clock 24 was assumed to be 1,428PPS, the output of 4:1 down counter 48 runs at a rate of 357PPS. This means that the highest frequency which may be sampled from signal source 10 is 357/2Hz or 178.5Hz. The highest frequency is compressed and translated to a frequency of 714Hz at the output since the compression factor C is equal to 4.

It should now be evident that the compression factor C of the device of FIG. 6 may be increased by simply increasing the clock rate while maintaining the shifting speed of analog shift register 40 the same. Therefore, the compression factor C can be increased substantially without changing the shifting speed of register 40. However, it is noted that a set of 512 sampling gates 41–44 are necessary and the shifting speed of register 45 must also be increased as the compression factor C is increased. Another notable limitation is that the compression factor C can assume only integer values for C greater than one and reciprocal integer values for C less than one.

Figure 8:
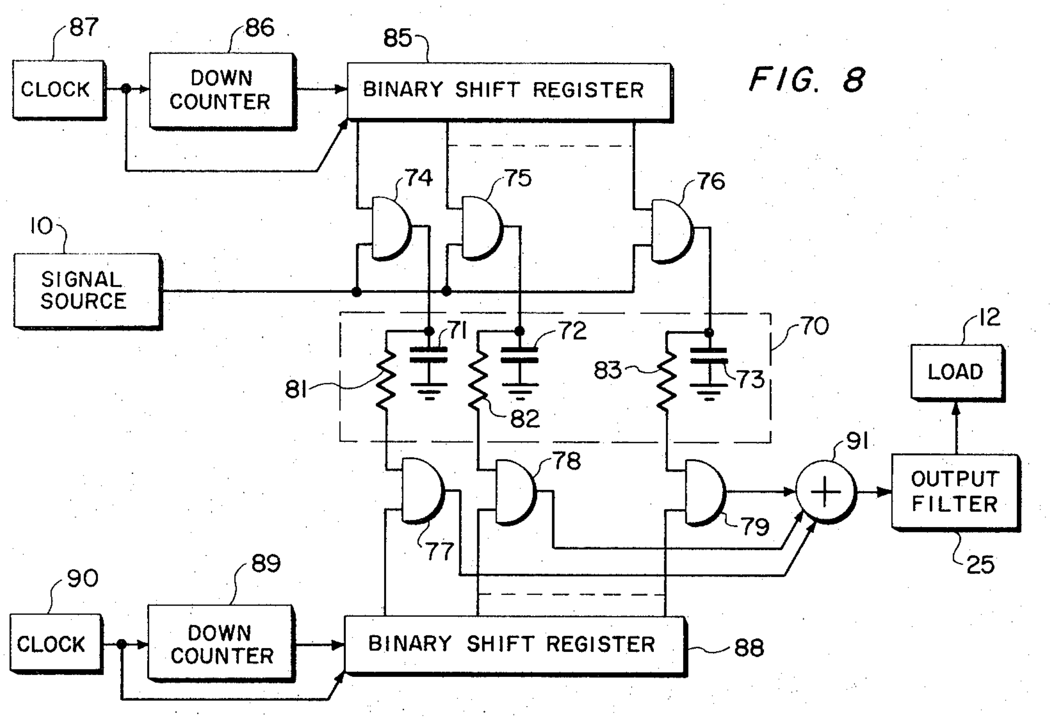
FIG. 8 shows a third embodiment of the invention.

The FIG. 8 modification includes an analog memory 70 which requires no shifting, but uses twice as many sampling gates as does the modification of FIG. 6. The memory 70 includes a set of analog storage elements such as capacitors 71, 72 and 73 connected between ground and the outputs of low impedance sampling gates 74, 75 and 76 respectively. Capacitors 71, 72 and 73 are also connected to the analog inputs of sampling gates 77, 78 and 79 respectively via high impedance resistors 81, 82 and 83, respectively. The binary inputs to sampling gates 74–76 are connected to successive stages of binary shift register 85 which derives its input from the down counter 86. The clock 87 drives the down counter 86 and the register 85. The analog inputs to sampling gates 74, 75 and 76 are connected to the output of signal source 10.

The binary inputs to sampling gates 77–79 are connected to the outputs of the successive stages of binary shift register 88, the input stage of which is connected to the output of down counter 89. Register 88 and counter 89 are driven by clock 90. Down counters 86 and 89 both have identical counts equal to the number of stages in registers 85 and 88 and memory 70.

The operation of the device of FIG. 8 will now be given. Assume that a binary one is stored in each of the input stages of the registers 85 and 88, and that the remaining stages all container binary zeros. Now, each of these binary ones will be shifted along its respective registers 85 or 88 at the rate of the clocks 87 and 90 respectively. When the binary ones exit from the output stages of the registers 85 and 88, the counters 86 and 89 will produce a new binary one which is automatically stored in the input stages of the registers 85 and 88. As these binary ones travel along their respective registers 85 and 88, the sets of gates 74–76 and 77–79 respectively will be opened one at a time and in succession. When the sampling gates 74–76 are opened, they become low impedance devices and an analog voltage sample appearing at the output of source 10 will be quickly stored on capacitors 71–73 respectively. When the sampling gates 77–79 are opened, the analog voltages on the capacitors 71–73 will be sampled in succession and appear at the summing point 91 which is connected to the load 12 via filter 25. The analog voltages on capacitors 71–73 will not be changed noticeably when sampled by gates 77–79 because of the high impedance resistors 81–83.

It should be obvious that the compression factor C in this device will depend on the ratio of the clock rates of clocks 87 and 90. If the number of stages in registers 85 and 88 both equal 512 then the total number of sampling gates 74–79 will equal 1,024; a large number. The advantages of the device of FIG. 8 under some circumstances outweigh the disadvantages of large size. It is again noted that no synchronization of relative phase or speed relationship need exist between clocks 87 and 90.

Figure 9:
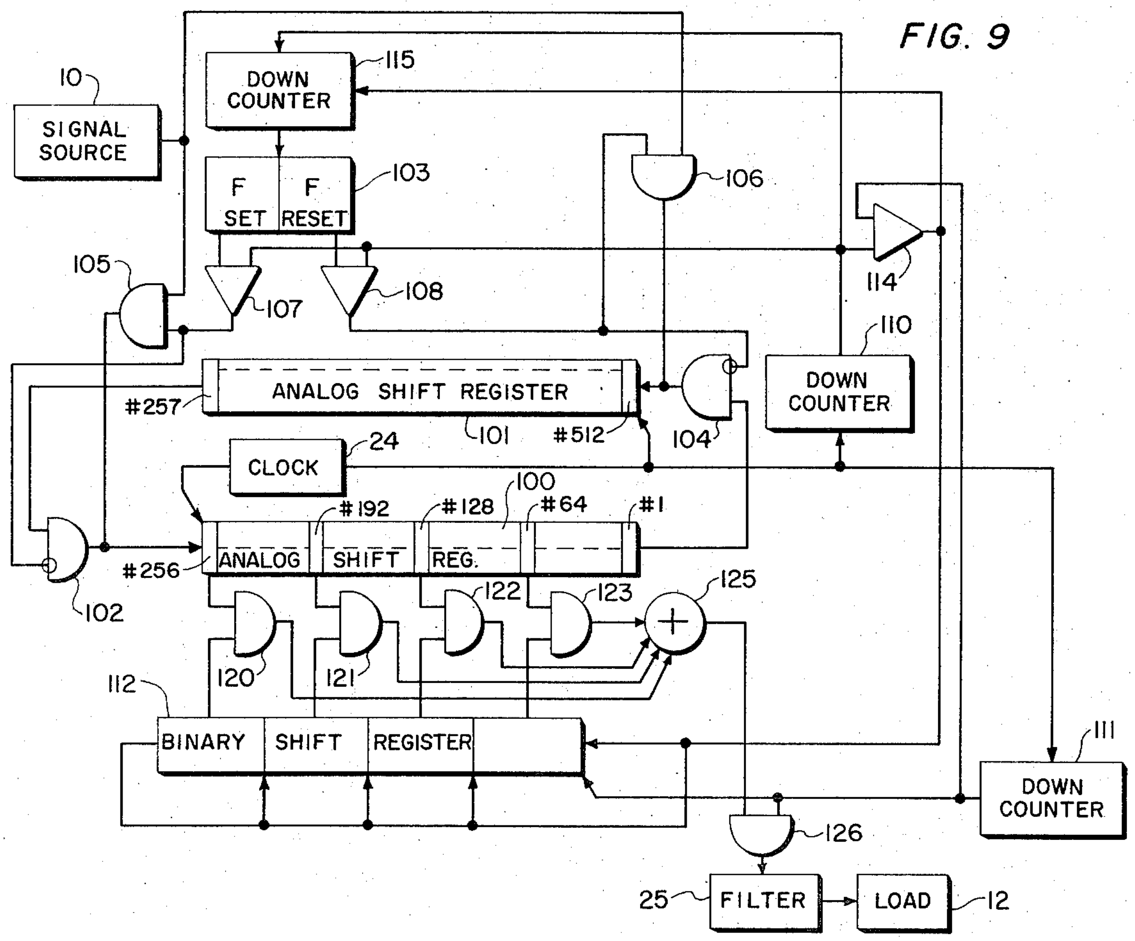
FIG. 9 shows a fourth embodiment of the invention.
Figure 10:
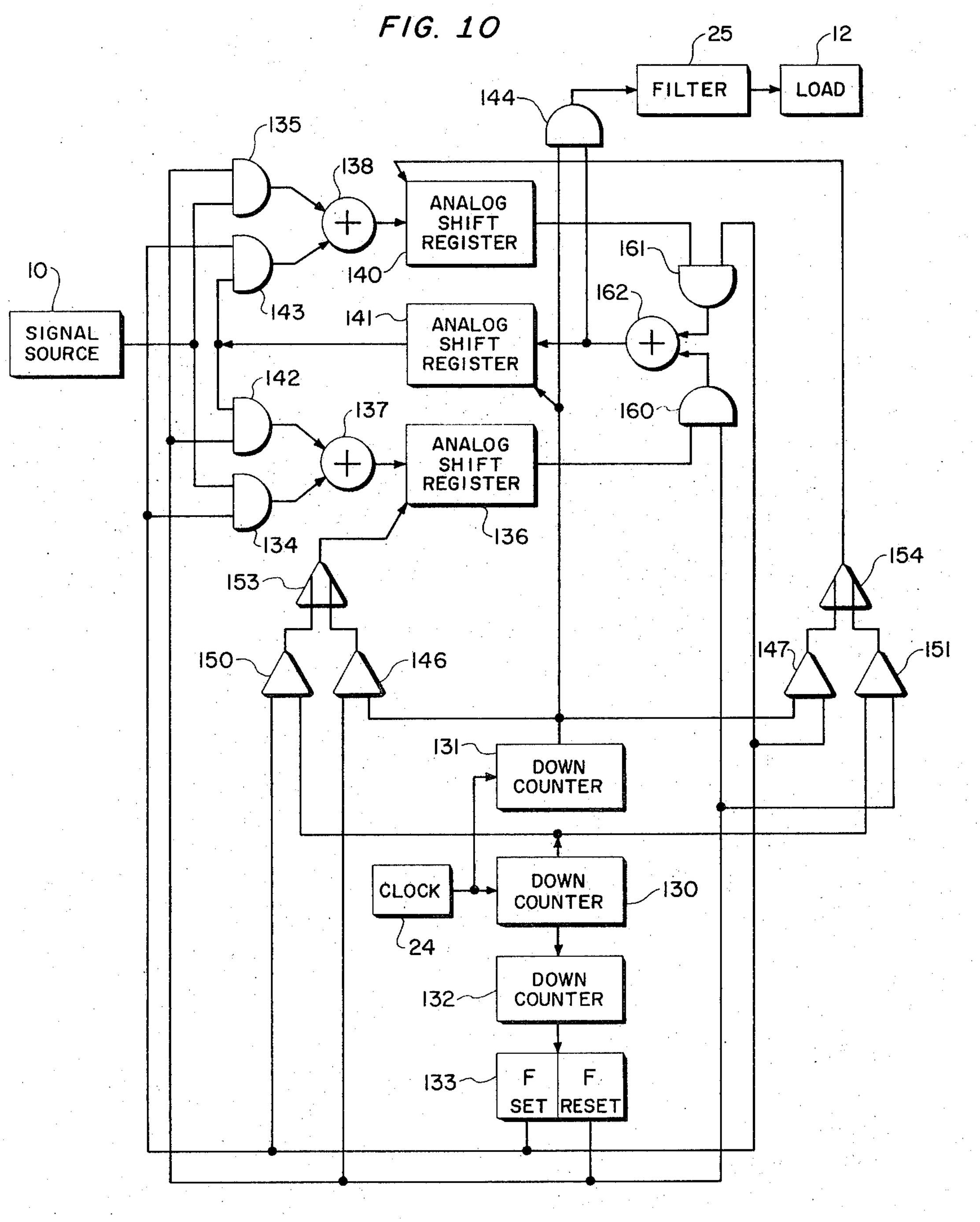
FIG. 10 shows a fifth embodiment of the invention.

Trade-offs between all of the modifications so far described are made in the modifications of FIGS. 9 and 10 which show two different time compressors capable of relatively large compression factors C with moderate shifting speeds and a reasonable number of sampling gates.

The device of FIG. 9 includes two analog shift registers 100 and 101, each having an equal number of stages, e.g., 256 stages each for a total of 512. These registers 100 and 101 are driven at the same rate by the output of clock 24. The output stage of register 101 is connected to the input stage of register 100 via the sampling gate 102. The binary input to sampling gate 102 includes an inverter and is connected to the set side of the output of flip-flop 103 via binary AND gate 107. The input stage of analog shift register 101 is connected to the output stage of register 100 via sampling gate 104 which includes an inverter in the binary input which is connected to the reset side of flip-flop 103 via AND gate 108. The input stages of registers 100 and 101 are also connected to the output of sampling gates 105 and 106 respectively. The binary input to sampling gates 105 and 106 are derived from the set and reset sides respectively of flip-flop 103 via AND gates 107 and 108 respectively. The analog inputs to sampling gates 105 and 106 are connected to the output of signal source 10.

Clock 24, besides driving registers 100 and 101, also drives down counters 110 and 111. The output of down counter 111 drives a four-stage binary shift register 112. The input stage of binary shift register 112 is connected to the output stage of the same register and to the output of the binary AND gate 114, which derives its binary inputs from the outputs of down counters 110 and 111. The down counter 110 also drives a down counter 115, the output of which is connected to the input of flip-flop 103. AND gates 107 and 108 are connected at the input to the set and reset sides respectively of the flip-flop 103 and to the output of down counter 110. The output of AND gate 114 is connected to the reset terminal of down counter 115.

Four sampling gates 120, 121, 122 and 123 have their binary inputs connected to a different one of each of the four stages in binary shift register 112. The analog inputs to sampling gates 120 to 123 are connected to the outputs of four of the stages in analog shift register 100. The outputs of sampling gates 120 to 123 are connected to a summing point 125, the output of which is connected to the analog input of a sampling gate 126. The sampling gate 126 derives its binary input from the output of down counter 111. The output of sampling gate 126 is connected to the load 12 via the filter 25.

The operation of the device of FIG. 9 will now be described. In general, samples from the output of signal source 10 fill the memory consisting of analog shift registers 100 and 101. These stored samples are shifted, at the rate of clock 24, around the ring consisting of register 100, gate 104, register 101 and gate 102. These stored samples are periodically updated from the output of signal source 10 via either gate 105 or 106, depending on the state of flip-flop 103, at the rate of the output of down counter 110.

The reading process for the device of FIG. 9 is controlled by the down counter 111 which shifts a binary one through register 112. The binary one in register 112 opens the gates 120–123 in succession while the sampling gate 126 periodically samples the outputs thereof. The compression factor C in this device is therefore determined by the ratio of the rates of down counters 110 and 111.

A specific example providing actual rates will now be given. Assume that the clock 24 runs at a rate of 35,700PPS and that registers 100 and 101 contain 256 stages each. Assume further that down counters 110, 111 and 115 have counting rates of 89:1, 25:1 and 4:1 respectively. Also for purposes of this discussion, assume that at some arbitrary starting point in time the samples in the analog shift register 100 are numbered from No. 1 to No. 256, starting at the output stage and ending at the input stage, and that the samples in analog shift register 101 are arbitrarily numbered from No.

257 to No. 512, from output stage to input stage. These numbers are shown in FIG. 9 and are to be considered the numbers of the samples contained in the stages of registers 100 and 101 at some arbitrary instant of time and are not the numbers of the stages themselves.

Assume further that the analog input to sampling gate 120 is connected to the input stage of register 100, which at the starting time contains sample No. 256, and that the analog input to gates 121, 122 and 123 are connected to the stages in register 100 containing the samples No. 192, No. 128 and No. 64 respectively at this arbitrary starting time.

Assume further that flip-flop 103 is in the reset state, i.e., with a binary one on the input to AND gate 108 and a binary zero to the input of AND gate 107. It is also assumed that at this arbitrary starting time, down counters 110, 111 and 115 are set at counts of 89, 25 and 4 respectively.

The output of clock 24 will shift the samples stored in registers 100 and 101 around the ring including register 100, sampling gate 104, register 101, sampling gate 102 and back to register 100. The samples will be shifted around this ring continuously at the clock rate of clock 24 and will be updated in synchronism with the output of down counter 110. On the 89th count of the output of clock 24, down counter 110 will produce the first output pulse resulting in the opening of gate 106 and the closing of gate 104 via the binary AND gate 108. Because the sampling gate 104 is now closed, the old sample No. 89 will be shifted into the closed gate 104 and an updated sample No. 89 will be shifted from the output of signal source 10 into the input stage of register 101 via the sampling gate 106.

At this point, down counter 110 is reset to 89 and the process is repeated. After 89 more counts of the output of clock 24 by counter 110, sample No. 178 will be updated in the same manner. The No. 178 is obtained by adding the number of the previously updated sample, i.e., No. 89 to the number of counts made by down counter 110, i.e., 89.

The next updated sample will be sample No. 267 which is obtained by adding sample No. 178 to the count of 89. After updating the first four samples, viz., samples No. 89, No. 178, No. 267 and No. 356, the down counter 115 which counts the output of down counter 110 and which was preset to 4, will have counted down fully and triggered flip-flop 103 from the reset to the set state. The AND gates 107 and 108 will now have a binary one and a binary zero respectively applied to the inputs from the set and reset sides respectively of flip-flop 103. The output pulses from down counter 110 will now open sampling gate 105 via AND gate 107. As a result, the next four updated samples will be sampled by sampling gate 105 and applied to the input stage of register 100. The number of the fifth sample to be updated can be calculated by considering that down counter 110 will have counted a total of 445 counts, i.e., 5×89, from the arbitrary starting point shown in FIG. 9. Since at the arbitrary starting time, sample No. 256 was contained in the input stage of register 100, then the sample number is calculated by adding 256 to the total number of counts, i.e., 445, to arrive at the No. 701. Of course, since there are only a total of 512 samples, then the number 512 must be subtracted from 701 to arrive at the sample No. 189. Therefore the fifth sample to be updated is sample No. 189. The fifth, sixth, seventh and eighth samples to be updated via sampling gate 105 will then be samples No. 189, No. 278, No. 367 and No. 456 respectively.

Again, down counter 115 will reset flip-flop 103 and the updating process will be switched back to the sampling gate 106 for the next four updating cycles. The ninth, tenth, eleventh and twelfth samples to be updated will be samples No. 289, No. 378, No. 467 and No. 44 respectively.

At the twelfth updating cycle, the flip-flop 103 will be driven into the set state and the next four samples to be updated will be samples No. 389, No. 478, No. 55 and No. 144. These four samples will have been updated via sampling gate 105. To summarize, the samples will be updated in the following order: No. 89, No. 178, No. 267, No. 356, No. 189, No. 278, No. 367, No. 456, No. 289, No. 378, No. 467, No. 44, No. 389, No. 478, No. 55, No. 144, etc.

The mechanism provided for reading the samples must, of course, be such as to read the samples in the same order in which they are updated. In order to understand the reading process, we will arbitrarily start the explanation at that point in time when the sample No. 89 is contained in that stage of register 100 which is connected to the analog input of sampling gate 123. It is also to be assumed at this same point in time that a binary one is contained in the input stage of binary shift register 112 and that the other stages contain binary zeros. The final assumption to be made is that the down counter 111 has just made a count of 25 clock pulses from clock 24 and produced an output pulse which opened sampling gate 126, thereby passing sample No. 89 to the load 12 via filter 25. The output pulse from down counter 111 will also shift the binary one from the input stage of register 112 to the second stage thereof with a resulting opening of sampling gate 122. The value of the sample passed by sampling gate 122 to the summing point 125 will be sampled by sampling gate 126 after 25 more clock pulses are counted by down counter 111. Sample No. 178 will now be contained in that stage of register 100 connected to the analog input of sampling gate 122 and will be read by sampling gate 126. Sample No. 178 will be read because the sampling gates 122 and 123 were originally assumed to be connected to stages of register 100 which were separated by 64 stages or 64 sample numbers. Since the down counter 111 counts 25 clock pulses between successive readings, the difference in the numbers of the samples read via gates 123 and 122 will be 89, i.e., 64 plus 25. Therefore, since the first sample read by sampling gate 126 was sample No. 89, the second read sample will be sample No. 178.

Likewise, the sampling gates 121 and 122 were also assumed to be connected to stages in register 100 which were separated by 64 stages. Therefore, after the next 25 counts of clock 24 by counter 111, the sample No. 267, i.e., 64 plus 25 plus 178, will be sampled by gate 126 via gate 121. Finally, because sampling gates 120 and 121 were also assumed to be connected to stages in register 100 which differed by 64, the next read sample will be sample No. 356, i.e., 64 plus 25 plus 267. Therefore, sampling gate 126 will have read in succession the following four samples: samples No. 89, No. 178, No. 267, No. 356 as the binary one is shifted along the binary shift register 112 from the input stage to the output stage by the output of down counter 111.

On the next cycle of down counter 111, the binary one will be shifted from the output stage of register 112 around and back into the input stage. At that time, sample No. 189 will be contained in that stage of register 100 connected to the sampling gate 123 and will therefore be read by the sampling gate 126. To confirm that the sample No. 189 will be in the proper stage, consider that there have been four cycles of down counter 111 completed since the original starting time of the explanation when it was assumed that sample No. 89 was contained in this same stage of register 100. Therefore, since each cycle of down counter 111 is equivalent to 25 clock pulses, there will have been a total of 100 clock pulses of clock 24. This value 100 is then added to the sample No. 89 to contain sample No. 189.

Continuing the cycle, the binary one is again shifted along binary shift register 112 by the output of down counter 111 and the following four samples will have been read: samples No. 189, No. 278, No. 367 and No. 456. It should now be obvious that the samples will be read in the exact same order in which they are updated but at a much faster rate.

It is also pointed out at this time that, in order to synchronize the above process, it is necessary that down counter 115 be set to a count of four when the input stage of binary shift register 112 contains a binary one and when down counters 110 and 111 simultaneously produce outputs therefrom. It is for this reason that AND gate 114 is provided. As can be seen from FIG. 9, when down counters 110 and 111 produce simultaneous counts, and therefore simultaneous outputs, AND gate 114 will generate an output pulse on the reset terminal of down counter 115 to insure that it is reset to the count of four. Simultaneously, the output of AND gate 114 will reset the input stage of binary shift register 112 to a binary one and set the other stages of register 112 to a binary zero.

It can be seen by comparison of the figures that the device of FIG. 9 is somewhat more complex and has a few more elements than the device of FIG. 4 has and contains substantially less elements than each of the devices of FIGS. 6 and 8. Using the specific examples given above, the devices of FIGS. 4 and 9 can be compared as follows:

| | DEVICE OF FIG. 4 | DEVICE OF FIG. 9 |
|---|---|---|
| Clock Rate (Shift Register Rate) | 292,740PPS | 35,700PPS |
| Approximate input sampling rate | 400PPS | 400PPS |
| Approximate Compression Factor | 3.5 | 3.5 |
| Number of stages in analog shift register | 512 stages | 512 stages |

From the above table, it should be noted that for the same size register, the same approximate compression factor C, and the same input sampling rates, the device of FIG. 9 has a clock rate substantially slower than that of the device of FIG. 4. In other words, the analog shift registers in the device of FIG. 9 will have shifting rates substantially slower than the shifting rates required for the analog shift register in the device of FIG. 4. Yet, the device of FIG. 9 can do the same job and is not much more complex than the device of FIG. 4. In many situations, the simplicity and the flexibility of the FIG. 4 device outweigh the speed disadvantages.

The device of FIG. 10 includes a clock 24 which drives down counters 130 and 131. The output of down counter 130 drives the down counter 132 which in turn is connected to the input of flip-flop 133. The output of signal source 10 is connected to the input of analog shift register 136 via sampling gate 134 and a summing point 137. The binary input to the sampling gate 134 is connected to the output of down counter 132 via the set side of the flip-flop 133. The output of signal source 10 is also connected to the input of analog shift register 140, via the sampling gate 135, and summing point 138. The binary input to the sampling gate 135 is connected to the reset side of flip-flop 133. The output of a third analog shift register 141 is connected to the input stages of analog shift registers 136 and 140 via sampling gates 142 and 143 respectively and summing points 137 and 138 respectively. The binary inputs to sampling gates 142 and 143 are connected to opposite sides of flip-flop 133. The analog shift register 141 is driven by the output of down counter 131 which is also connected to one of the inputs of binary AND gates 146 and 147. The other inputs to AND gates 146 and 147 are connected to the reset and set sides respectively of the output of flip-flop 133. The output of down counter 130 is connected to one of the inputs of both binary AND gates 150 and 151 which derive the second inputs from the set and reset sides respectively of flip-flop 133. The outputs of AND gates 146 and 150 are used to drive analog shift register 136 via OR gate 153. Analog shift register 140 is driven by the output of AND gates 147 and 151 via OR gate 154. The output stages of analog shift registers 136 and 140 are connected to the input stage of analog shift register 141 via sampling gates 160 and 161 respectively and a summing point 162. The output of summing point 162 is connected to the load 12 via gate 144 and filter 25. In general, the device of FIG. 10 operates as follows: A group of successive samples are stored in registers 136 and 141 and are shifted, by the output of down counter 131, around a ring consisting of the analog shift register 141, sampling gate 142, summing point 137, analog shift register 136, sampling gate 160 and summing point 162. As the samples are shifted around this ring, they are sampled by sampling gates 144 and passed to load 12 via filter 25. Also, the memory is updated by filling analog shift register 140 with a succession of new samples from signal source 10 via sampling gate 135 and summing point 138. When the analog shift register 140 is filled with the most recent samples from the signal source 10, down counter 132 changes the state of flip-flop 133, causing registers 140 and 141 to form a new ring around which the samples contained therein are shifted. The samples in analog shift register 136 are now updated with new samples from signal source 10 via sampling gate 134 and summing point 137.

More specifically, let it be assumed that clock 24 is running at a rate of 292,740PPS. Also assume that down counters 130, 131 and 132 have counting rates of 717:1, 205:1, and 205:1 respectively. When flip-flop 133 is in the set state, sampling gates 134, 143 and 161 are open and sampling gates 135, 142 and 160 are closed. Further, because flip-flop 133 is in the set state, analog shift register 136 will be driven by the output of down counter 130 via AND gate 150 and OR gate 153. Analog shift register 140 will be driven by the output of down counter 131 via AND gate 147 and OR gate 154. Therefore, because flip-flop 133 is in the set state, both analog shift registers 141 and 140 are driven at the same rate by the output of the same down counter 131. The samples stored in analog shift registers 141 and 140 are now simply shifted around the ring. Also operated at the rate of the output of down counter 131, sampling rate 144 samples the values of the samples being shifted into analog shift register 141 from register 140.

While the samples are being read by sampling gate 144, the updated samples, from signal source 10, will be shifted into analog shift register 136 at the rate of the output of down counter 130 via AND gate 150 and OR gate 153. For purposes of this example, it can be assumed that analog shift register 141 contains a total of 307 stages and that analog shift registers 140 and 136 contain 205 stages each. Therefore, while the 205 samples are being updated in analog shift register 136 over a time period of 205 × 717/292,740 seconds, the 512 samples, contained in the ring formed by registers 140 and 141, will be shifted 717 times at a rate of 292,740/205PPS by the output of the 205:1 down counter 131. Also, after the 205 updated samples have been shifted from signal source 10 to register 136, the flip-flop 133 will be triggered by the output pulse from the 205:1 down counter 132. At this point the longest stored 205 samples in the entire memory will now be contained in the 205 stages of the analog shift register 140 and the newest or most recently updated 205 samples will be contained in the 205 stages of analog shift register 136. As explained earlier, the registers 136 and 141 will now form a new ring permitting the 205 samples contained in register 140 to be replaced by 205 newer samples from signal source 10. Each time the ring is shifted by flip-flop 133, registers 136 and 140 will contain either the oldest 205 samples or the newest 205 samples and vice versa.

Comparison of the devices of FIGS. 4, 9 and 10 may be made from the following table:

| | FIG. 4 | FIG. 9 | FIG. 10 |
|---|---|---|---|
| Rate of Fastest Shift Register | 292,740PPS | 35,700PPS | 1428PPS |
| Approximate input sampling rate | 400PPS | 400PPS | 400PPS |
| Approximate Compression Factor C | 3.5 | 3.5 | 3.5 |
| Total number of stages in analog shift registers | 512 stages | 512 stages | 717 stages |

It is noted that the rate at which the shift registers are shifted has been reduced considerably in the device of FIG. 10. However, the total number of stages is somewhat increased over the devices of FIGS. 4 and 9. It is also noted that an updated sample in the device of FIG. 4 is read as soon as possible. In contrast, the 205 updated samples in the device of FIG. 10 are not read immediately, but must wait for the flip-flop 133 to switch states and form a new ring before being read.

Throughout the explanations of the above examples, the compression factor C was usually assumed to be greater than one. All of these devices can also have compression factors C less than one by simply changing the down counter rates. For example, the device of FIG. 4 was described earlier as capable of having a compression factor C between one and zero by simply changing the relative counting rates of down counters 32 and 33. However, in most cases the mere change in counting rates does not produce the most efficient use of the equipment. More efficient time compressors having compression factors C between zero and one can be constructed with only slight changes in structure.

Figure 11:
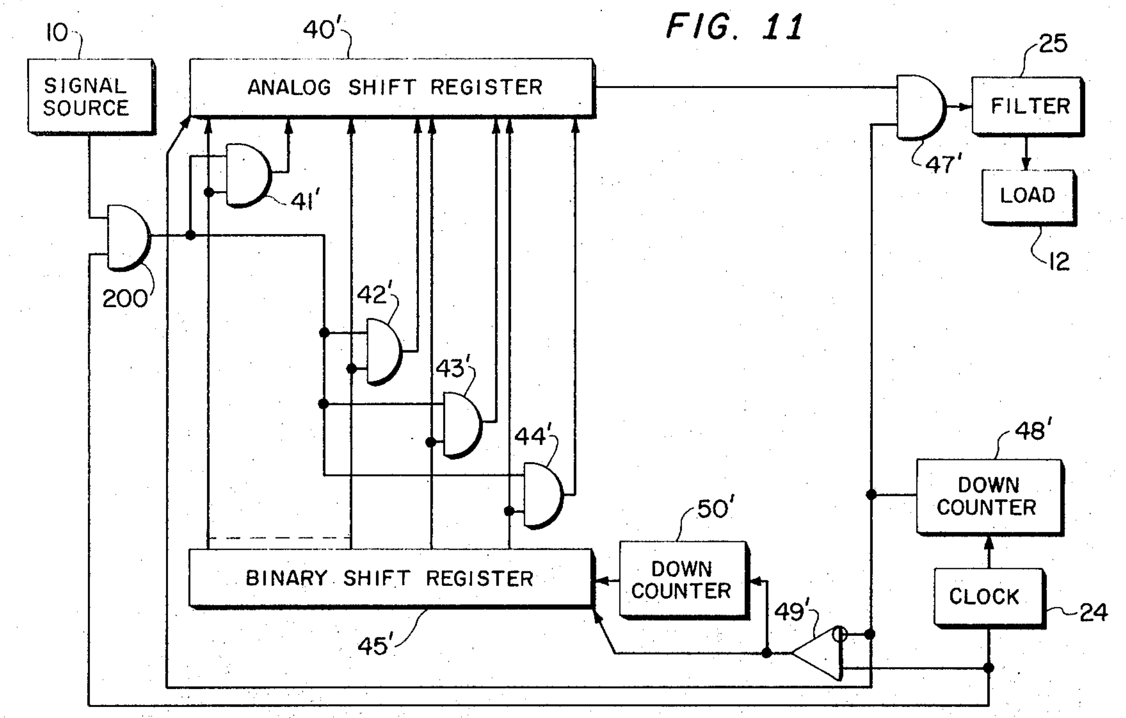
FIG. 11 shows a modification of the device shown in FIG. 6.

FIG. 11 shows a modification of the structure of FIG. 6, wherein a compression factor C between zero and one is realized. The primed reference numbers used in FIG. 11 are applied to those elements which correspond to the unprimed numbers on FIGS. 6. The device in FIG. 11 has the output of the signal source 10 connected to the analog inputs of sampling gates 41' to 44' via a sampling gate 200. The binary input to sampling gate 200 is connected to the output of clock 24. The outputs of sampling gates 41' to 44' are connected to the inputs of the successive stages of analog shift register 40'. The output stage of register 40' is connected to the analog input of sampling gate 47'. Analog shift register 40' is driven by the output of down counter 48'. Binary shift register 45' is also driven by the output of clock 24 via the AND gate 49' which also drives down counter 50'. The output of down counter 50' is connected to the input stage of binary shift register 45'. The output of down counter 48' is connected to the binary input of sampling gate 47' and inhibits AND gate 49' via the inverted input thereto.

The operation of the device in FIG. 11 is substantially the same as that in FIG. 6. Assume that the analog shift register 40' contains 512 stages, that down counter 48' has a counting rate of 4:1 and that down counter 50' has a counting rate of 2,046:1. Samples are supplied to the analog shift register 40' from the output of signal source 10 via sampling gate 200 and the sampling gates 41' to 44' under the control of a binary one originally placed in binary shift register 45' by the output of down counter 50'. Clock 24 drives binary shift register 45' via AND gate 49' and, therefore, moves the binary one contained therein in the same manner as in the device of FIG. 6, i.e., the binary one is shifted three successive steps followed by a pause due to the inhibiting of gate 49' by the output of down counter 48' on each fourth clock pulse. During every fourth clock period in which the binary shift register 45' is not shifted, the sample in the output stage of register 40' will be sampled by gate 47' and by shifting all the samples in register 40' one stage towards the output thereof by the output of down counter 48'. The output of each of the stages of register 45' is connected to each of the stages of register 40', to provide the control signal which inhibits that stage in register 40' associated with the binary one in register 45' from reading the sample in the previous stage of register 40', thereby permitting the associated output of one of the gates 41' to 44' to be stored in the register 40'. It will take 512 (the number of stages in register 40'), plus one-third of 512 without remainder, i.e., 170 (the number of pulses read), for a total of 682 clock pulses to fill register 40'. On the 682nd clock pulse from clock 24, he binary one in binary shift register 45' will have reached the output stage and the register 40' will be full of samples from signal source 10. From this point on no more new samples will be inserted in register 40' until it is again empty. It will take 512 more pulses from the output of 4:1 down counter 48' to empty the full register 40'. Since there were 170 pulses produced by down counter 48' during the filling of register 40' and since 512 more pulses from down counter 48' will be needed to empty register 40', there will have been a total of 682 pulses generated by down counter 48' during one complete cycle of filling and emptying register 40'. A total of 682 pulses from down counter 48' is equivalent to 2,728 clock pulses from clock 24, i.e., 4 times 682, which in turn is equivalent to 2,046 pulses from the output of AND gate 49' and one pulse from the output of down counter 50'. A new binary one is therefore inserted in the input stage of register 45' at this point, and the cycle is again repeated. In this example the compression factor C is 1/4.

It should now become obvious to those skilled in the art that one could provide a means for converting the configuration shown in FIG. 6 into the configuration shown in FIG. 11 and vice versa by including one or more manual switches which when operated simply reconnects the conductors from one configuration to the other. The number and type of elements are identical and the connection is the only change. The placement of the manual switches is arbitrary and well within the skill of the art and for convenience is not shown on the drawing.

A simple manual switch could also be added to the device of FIG. 8, making possible a change in configuration to produce a relatively efficient device having a compression factor C between zero and one. For example, consider a switch which eliminates the down counter 86 and connects the output of down counter 89 to the input stage of binary shift register 85. Providing this simple manual switch and, of course, assuming that the clock 90 now runs slower than the clock 87, the operation of the device in FIG. 8 with a compression factor C between zero and one becomes obvious. First, the down counter 89 inserts binary ones simultaneously in the input stages of registers 85 and 88. Then the binary one in register 85 is shifted through register 85 at the rate of clock 87, thereby inserting 512 samples in the 512 capacitors 71–73 via gates 74–76. These 512 samples are simultaneously read out at the slower rate of clock 90 by the sampling gates 77–79, which are opened in succession by the binary one in register 88. Since the samples are written into the capacitors 71–73 at a faster rate than they are read out, the input frequency is translated down. It should be noted at this point that, since the binary one in register 85 will have been shifted out of the output stage of register 85 long before the 512:1 down counter 89 is ready to insert a new binary one in the input stage of register 85, there will be a substantial time delay before the capacitors 71–73 are updated. In other words, the device will be waiting for the 512 samples in the capacitors 71–73 to be fully read before it will again sample the output of signal source 10 and update the capacitors 71–73. There will therefore be a substantial portion of the input signal which will simply be ignored. This phenomena is true in all cases of negative compression or expansion. If it is important that all of the input signal be observed and analyzed, then two or more expanders may be used simultaneously and synchronized with each other such that each expander looks at different but successive or overlapping segments of the input signal. The multiple outputs could be superimposed on a common load such as a loudspeaker or oscilloscope, or they could be applied to a plurality of separate loads.

The devices of FIGS. 10 and 11 will likewise have compression factors C between zero and one by simply changing the relative counting rates of the down counters. However, more efficient use of the registers which make up the memory can be realized by those skilled in the art, if modifications similar to those described in connection with the devices of FIGS. 6 and 11 are made.

It was pointed out earlier that the invention contemplates the use of a plurality of binary shift registers in place of the analog shift registers shown in the various modifications. FIG. 12 shows a memory consisting of three binary shift registers 160, 161 and 162. All shift registers 160, 161 and 162 are driven by the output of clock 24. The input stages of binary shift registers 160–162 are each connected to a different output of a three output analog-to-digital converter 163 which in turn is connected to an analog input terminal 164. Associated with each of these binary shift registers 160–162 are sets of AND gates 170–172, 180–182 and 190–192. One of the inputs of gates 170, 180 and 190 are connected to the output of the input stages of registers 160, 161 and 162 respectively. The other inputs to AND gates 170, 180 and 190 are connected in common to the control 175. AND gates 171, 181 and 191 are connected to the output of corresponding stages in registers 160–162 respectively and to a second output of control 175. The inputs to AND gates 172–192 are connected to the output stages of registers 160–162 respectively and to a third output from control 175. As indicated by the broken lines in FIG. 12, any number of gates may be connected to the stages of registers 160–162. OR gate 176 has inputs connected to the outputs of AND gates 170–172. OR gate 177 has the inputs connected to the output of AND gates 180–182. OR gate 178 has inputs connected to the outputs of AND gates 190–192. The outputs of OR gates 176, 177 and 178 are connected to the inputs of a digital-to-analog converter 179.

The analog-to-digital converter 163 quantizes the analog input on terminal 164 into one of $2^n$ levels and produces an *n*-bit binary code at the outputs. Each of the binary bits are stored in a different one of the binary shift registers 160–162 at the rate of clock 24. Therefore, the values of the samples of the analog voltages on terminal 164 are stored in the memory in the from of a binary code, the elements of which are stored in corresponding stages of each of the registers 160–162. These values of the samples may be read from the registers 160–162 by the control 175 which selectively opens one of the sets of gates 170–190, or 171–191, or 172–192. The control 175 could read the information in the various registers 160–162 in accordance with any one of the different methods employed in the various modifications shown previously. For example, if the device of FIG. 12 were used in place of the analog shift register 31 in FIG. 4, only the AND gates 172, 182 and 192 need ever be opened by control 175, because samples are read from register 31 at the output stage only. However, if the device of FIG. 12 were used in place of the analog shift register 40, shown in the modification of FIG. 6, gates would have to be connected to all stages of registers 160–162. The control 175, in this case, would be the binary shift register 45 in FIG. 6.

It is also pointed out that in those cases where a feedback path from the output of the analog shift register or memory is shown, as in the device of FIG. 9, many options are possible for providing feedback in the device of FIG. 12. For example, a feedback path from the output terminal 185 could be connected via a gate directly back to the input terminal 164. Those skilled in the art could also connect individual feedback paths to each of the registers 160–162. Of course, those skilled in the art will have no trouble modifying any of the various devices to include the binary shift register memory of FIG. 12 in place of the analog shift register.

It should be understood, that the foregoing disclosure relates to only preferred embodiments of the invention and that numerous other modifications or alterations may be made therein without departing from the spirit and the scope of the invention as set forth in the appended claims.

What is claimed is:

1. An electronic time compressor and expander for translating an input signal from a first frequency band to a second frequency band comprising:

a source of said input signals from said first frequency band;

clock means for generating clock signals at a clock rate;

a control means connected to the output of said clock means for generating a plurality of control signals at predetermined rates;

a first sampler means connected to said source of input signals and said control means for sampling said input signal at a first sampling rate as determined by said control means;

shift register means, having a predetermined number of stages, with the input of at least one stage connected to the output of said first sampler means, for storing a predetermined plurality of said samples obtained by said first sampler means;

said shift register means further including means connected to said control means for shifting said stored samples through said stages of said shift register means in a predetermined sequence at a rate determined by said control means;

a second sampler means connected to said control means and the output of at least one stage of said shift register means for sampling the contents of said shift register means at a second sampling rate different than said first sampling rate under the control of said control means; and filter means connected to the output of said second sampler means for passing signals in said second frequency band.

2. The electronic time compressor and expander according to claim 1 wherein said first sampler means includes a sampling gate means having inputs connected to said input signal source and said control means and having an output means connected to said shift register means for sampling said input signal at a rate determined by said control means.

3. The electronic time compressor and expander according to claim 2 wherein said control means is connected to said sampling gate means for opening said gate means to sample said input signal and to store said samples in said stages at a rate determined by said control means.

4. The electronic time compressor and expander according to claim 3 wherein said stages of said shift register means each includes an analog storage means for storing the analog value of said input signal.

5. The electronic time compressor and expander according to claim 1 wherein said first sampler means includes a plurality of sampling gates having inputs connected to said input signal and said control means and each having the outputs thereof connected to the input of a different one of said stages of said shift register means for sampling said input signal at a rate determined by said control means.

6. The electronic time compressor and expander according to claim 5 wherein said control means is connected to said sampling gates for opening said gates one at a time to sample said input signal and to store said samples in said stages of said shift register means at a rate determined by said control means.

7. The electronic time compressor and expander according to claim 6 wherein said stages of said shift register means each includes an analog storage means for storing the analog value of said input signal.

8. The electronic time compressor and expander according to claim 6 wherein said second sampler means includes a plurality of sampling gates each connected to a different one of said stages of said shift register means and said control means for sampling the values stored in said shift register means when opened by said control means; and said control means including means for opening said gates at a rate determined by said control means.

9. The electronic time compressor and expander according to claim 8 wherein said stages of said shift register means each includes an analog storage means for storing the analog value of said input signal.

10. The electronic time compressor and expander according to claim 6 wherein said second sampler means includes a sampling gate connected to said shift register means and said control means for sampling a value stored therein when opened by said control means; and said control means including means for opening said gate at said second sampling rate.

11. The electronic time compressor and expander according to claim 10 wherein said stages of said shift register means each includes an analog storage means for storing the analog value of said input signal.

12. The electronic time compressor and expander according to claim 1 wherein said shift register means includes an input stage, an output stage and a plurality of intermediate stages;

the output of said first sampler means connected to said input stage; and said control means connected to said first sampler means and said shifting means for inserting successive ones of said samples into said input stage means and for shifting said samples successively through said intermediate stages and out said output stage.

13. The electronic time compressor and expander according to claim 12 wherein said second sampling means includes a plurality of sampling gates each connected to a different one of said stages of said shift register means for sampling the values stored therein when said sampling gates are opened; and said control means including means connected to said sampling gates for opening said gates one at a time at said second sampling rate in accordance with said stored sequence.

14. The electronic time compressor and expander according to claim 13 wherein said means for opening said gates includes a binary shift register means having a plurality of binary stages the output of each connected to a different one of said gates for opening said gates when said binary stage connected thereto contains a binary control bit; and said control means including means for inserting one binary control bit in said binary shift register means and for shifting said binary shift register means at said second sampling rate determined by said control means.

15. The electronic time compressor and expander according to claim 12 wherein said second sampling means includes a sampling gate connected to said shift register means for sampling a value stored therein when said sampling gate is opened; and said control means including means connected to said sampling gate for opening said gate at said second sampling rate.

16. The electronic time compressor and expander according to claim 12 wherein said second sampling means includes a sampling gate connected to said first sampling means, said output stage and said control means for selectively sampling either the output of said first sampling means or the output of said output stage of said shift register means at a rate determined by said control means.

17. An electronic time compressor and expander for translating input signals from a first frequency band to a second frequency band comprising:

a source of said input signals in said first frequency band;

a clock means for generating clock signals at a clock rate;

a control means connected to the output of said clock means for generating first and second control signals having rates which are submultiples of said clock rate;

a shift register means, including an input stage, an output stage, and a plurality of intermediate stages;

said clock means connected to said shift register means for driving said shift register means at said clock rate;

a first sampler means connected to said source of input signals, said control means, and said input stage for sampling said input signals at the rate of said first control signal and for inserting said samples in said input stage;

a second sampler means connected to the output of said first sampler means, said output stage, and said control means for sampling the outputs of said first sampler means and said output stage at the rate of said second control signal; and filter means connected to the output of said second sampler means for passing signals in said second frequency band.

18. An electronic time compressor and expander for translating input signals from a first frequency band to a second frequency band comprising:

a source of signals in said first frequency band;

a clock means for generating clock signals at a clock rate;

a control means connected to the output of said clock means for generating control signals at first, second and third rates;

first and second shift register means each including an input stage, an output stage, and a plurality of intermediate stages;

said clock means connected to said first and second shift register means for driving said shift register means at said clock rate;

a first sampler means connected to said source of input signals, said control means, and said input stages of each said shift register means for sampling said input signals at said first rate and for inserting groups of samples in one of said input stages of a different one of said register means at a second rate;

means connected to said control means and connected between said input stages of each one of said shift register means and said output stage of the other one of said shift register means for passing samples between said input and output stages of each of said shift register means except during those periods when said first sampler means is inserting one of said input samples into one of said shift register means;

a second sampler means connected to at least one of said shift register means and said control means for sampling selected ones of said stages at said third rate; and filter means connected to the output of said second sampler means for passing signals in said second frequency band.

19. An electronic time compressor and expander according to claim 18 wherein said second sampling means includes a plurality of sampling gates each connected to a different one of said stages for sampling said stages when opened; and said control means including means connected to said sampling gates for opening said gates one at a time at said third rate.

20. The electronic time compressor and expander according to claim 19 wherein said means for opening said gates includes a binary shift register means having a plurality of binary stages the output of each connected to a different one of said gates for opening said gates when said binary stage connected thereto contains a binary control bit; and said control means including means for inserting one said binary control bit in said binary shift register means and for shifting said binary shift register means at said third rate.

21. An electronic time compressor and expander for translating input signals from a first frequency band to a second frequency band comprising:

a source of signals in said first frequency band;

a clock means for generating clock signals at a clock rate;

a control means connected to the output of said clock means for generating control signals at first, second and third rates;

first, second and third shift register means each having a plurality of stages for storing instantaneous samples of said input signal;

a first sampler means connected to said source of signals and said control means for sampling said input signal at said first rate and for passing groups of said samples of said input signal alternately to said first and second shift registers at said second rate;

second sampler means connected to said shift register means and said control means for connecting said third shift register means alternately with said first and second shift register means to form a ring during those periods when said second and first shift register means respectively are storing samples from said first sampler means and for shifting samples around said ring at said third rate;

third sampler means connected to said third shift register means and said control means for sampling at said third rate said samples being shifted around said ring; and filter means connected to the output of said third sampler means for passing signals in said second frequency band.

22. An electronic time compressor and expander according to claim 1 wherein said first sampling means includes:

a first sampling gate having a first input connected to said signal source and a second input connected to said control means;

a plurality of sampling gates having inputs connected to the output of said first sampling gate and the output of each of said sampling gates connected to a different stage of said shift register means;

means connected to said control means and to the input of each of said sampling gates for opening said sampling gates in a predetermined sequence to store a sample of said input signal in said shift register means at a rate determined by said control means.

* * * * *